May 26, 1931.  E. A. SODERBERG  1,807,448
FISH CUTTING MACHINE
Filed Feb. 13, 1929
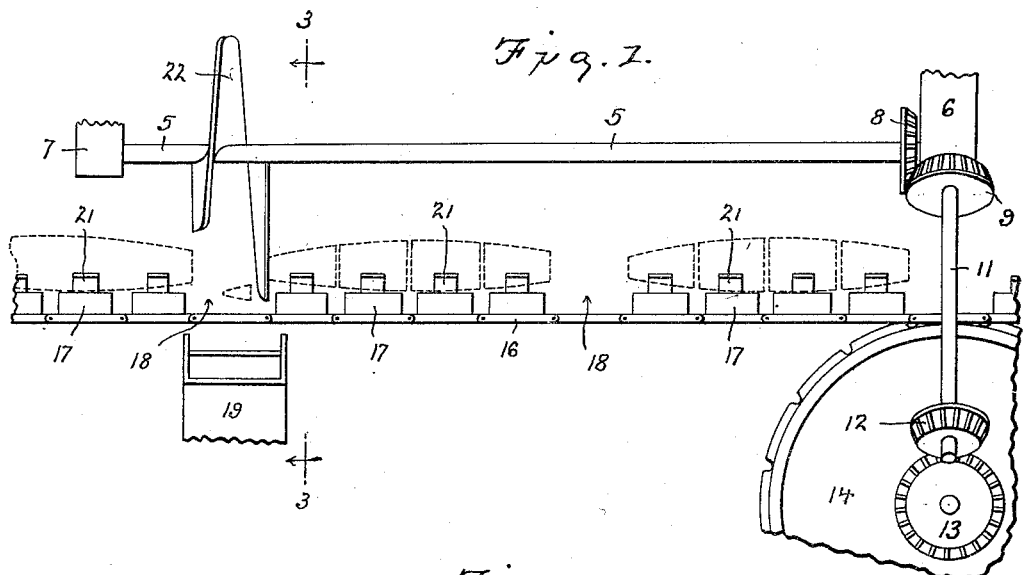
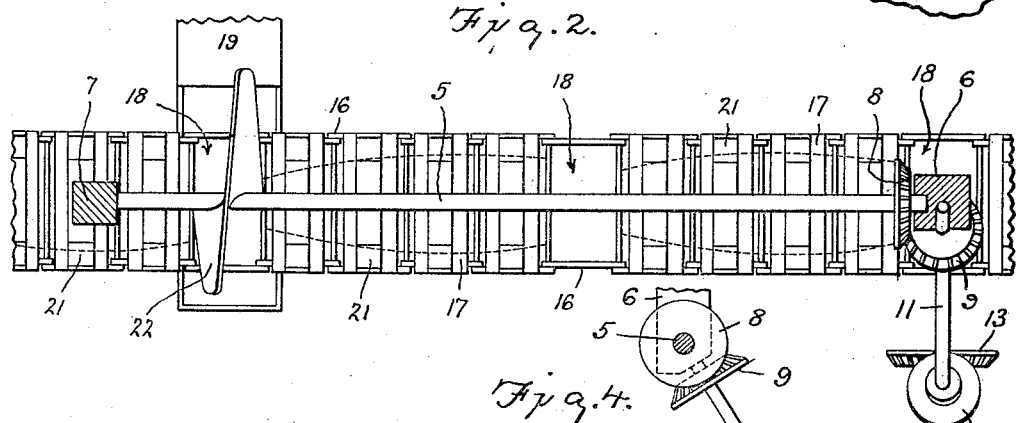
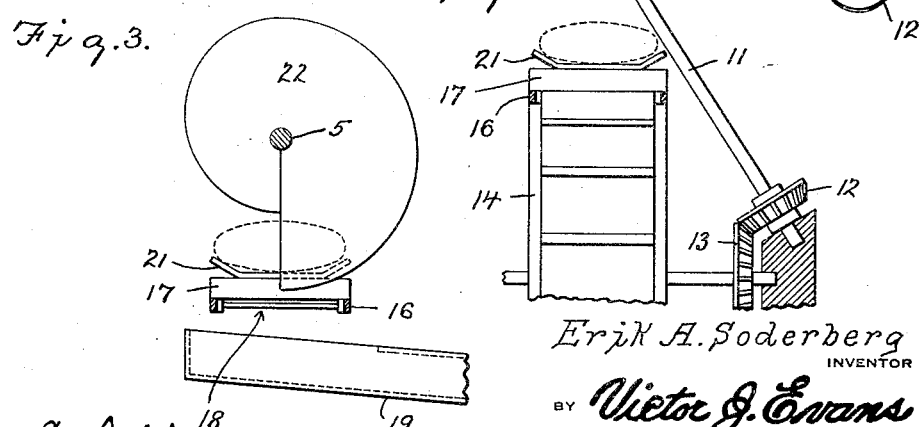
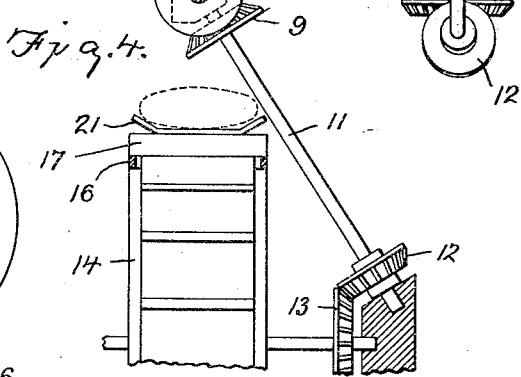
Erik A. Soderberg
INVENTOR
BY Victor J. Evans
ATTORNEY
WITNESS: Lee Brush Patented May 26, 1931

1,807,448

UNITED STATES PATENT OFFICE

ERIK A. SODERBERG, OF ALAMEDA, CALIFORNIA, ASSIGNOR OF ONE-HALF TO GEORGE GUNDERSEN, OF ALAMEDA, CALIFORNIA

FISH CUTTING MACHINE

Application filed February 13, 1929. Serial No. 339,661.

This invention relates to improvements in fish cutting machines.

The principal object of this invention is to provide means whereby a fish may be cut into a definite number of parts and any waste left after the fish has been cut will be automatically deposited into a trough for consumption at a distant point.

A further object is to provide a device which is simple in construction, economical to manufacture and one which will not become easily deranged.

A still further object is to provide means whereby a fish irrespective of its length will be divided into but four equal parts so as to be a proper length for canning.

Other objects and advantages will be apparent during the course of the following description.

In the accompanying drawings forming a part of this specification and in which like numerals are employed to designate like parts throughout the same, Figure 1 is a side elevation partly broken away, of a cutting mechanism illustrating my invention, and Figure 2 is a top plan view illustrating the device.

Figure 3 is a sectional view taken on the line 3—3 of Figure 1, illustrating the knife.

Figure 4 is a fragmentary end elevation illustrating the driving connection between the knife shaft and one of the sprockets of the endless conveyor.

At the present time, in the canning industry it is common to employ labor for cutting off the heads and tails of the fish such as salmon. The fish are then cut into lengths by hand with the result that the lengths of fish are not of the same size and do not fit the cans. In some instances, a plurality of knives definitely spaced are brought down against the fish. This causes a squeezing or compressing action which destroys the shape of the fish and has been discarded. It has been attempted to employ several rotary knives but the action of the several knives caused the fish to be thrown out of the conveyor and therefore but one cut can be made at a time in making the cutting operation.

Applicant has therefore devised a machine comprising a shaft 5 which is carried in journals 6 and 7. This shaft 5 has a gear 8 secured thereto, which gear meshes with a gear 9 mounted upon a shaft 11. This shaft 11 carries a gear 12 which meshes with a gear 13 carried upon a sprocket wheel 14. The manner of operating the sprocket wheel 14 may be any that is convenient for use with the machine. Conveyor chains 16 pass over the sprocket wheel 14 and up on these conveyor chains, blocks 17 are positioned. These blocks are spaced from each other and at the same time the groups of blocks are spaced so as to leave a space 18 between each group. The purpose of this space will be later seen.

A trough 19 is located beneath the conveyor, and so positioned that it will receive the tail and head portion when the same pass thru the conveyor. Carried upon each block is a cradle 21, which has upturned ends, the purpose of which is to hold the fish upon the block both before and after it is severed into sections. Mounted upon the shaft 5 is a rotary knife 22. This knife is so designed that it is spiral and helical in shape and progressively larger from one end of the blade edge to the other end, the result being that only one portion of the knife is in contact with the fish at one time. The speed of the knife and the speed of the conveyor is so timed that the largest diameter of the knife will pass downwardly between each of the blocks 17, thus severing the fish at each revolution and as the fish has progressed a definite distance.

Preferably the heads of the fish are removed in any well known manner before the fish are placed on the conveyor, however this is not necessary as the groups of blocks are arranged to support a fish with the tail and head unsupported and disposed over the spaces 18 between the groups of blocks and when severed by the knife they will fall into the trough 19.

In operation, the fish are positioned in the cradles 21 of the groups of blocks as shown in Figure 1 and during the travel of the conveyor and the knife rotating each fish is cut into four sections of substantially equal lengths and as the tail is the last to be severed, said tail drops through the space 18 into the trough, while the sections of the fish supported by the cradles 21 continue to advance with the conveyor and are removed manually or otherwise and as the sections are substantially equal in length they may be conveniently placed into cans. It is to be understood that the knife passes entirely through the fish between the blocks thereby assuring complete severance of the fish.

It will thus be seen that I have produced a device that will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a fish cutting device, a conveyor mechanism having a plurality of blocks positioned thereon and spaced one from another, certain of said blocks being spaced a greater distance than the remainder of said blocks and a rotary knife positioned above said conveyor and rotating about an axis parallel to the conveyor, the rotation of said knife and the movement of said conveyor being timed so that said knife will pass between said blocks on each revolution.

2. A fish cutting device comprising an endless conveyor, groups of blocks mounted on the conveyor and each group spaced from the adjacent groups to provide discharge spaces, a trough under the conveyor, means on the blocks to support a fish with the ends thereof unsupported and disposed over the discharge spaces, a rotary knife associated with the conveyor to sever the fish into sections of substantially equal lengths and to sever the unsupported ends of the fish and permit them to fall through the discharge spaces to the trough.

In testimony whereof I affix my signature.

ERIK A. SODERBERG.